CIRCUIT ARRANGEMENT FOR AN INTERCOM SYSTEM WITH ALTERNATIVE OPERATION

Filed Feb. 8, 1961

INVENTORS
HANS-ULRICH KNAUER
GEORG VOGEL
RUDOLF BAYER
By R P Morris
Attorney

July 16, 1963 HANS-ULRICH KNAUER ET AL 3,098,122

CIRCUIT ARRANGEMENT FOR AN INTERCOM SYSTEM WITH ALTERNATIVE OPERATION

Filed Feb. 8, 1961 3 Sheets-Sheet 2

INVENTORS
HANS-ULRICH KNAUER
GEORG VOGEL
RUDOLF BAYER
By R. P. Morris
Attorney

July 16, 1963 HANS-ULRICH KNAUER ETAL 3,098,122

CIRCUIT ARRANGEMENT FOR AN INTERCOM SYSTEM
WITH ALTERNATIVE OPERATION

Filed Feb. 8, 1961 3 Sheets-Sheet 3

INVENTORS
HANS-ULRICH KNAUER
GEORG VOGEL
RUDOLF BAYER

By [signature]
Attorney

United States Patent Office 3,098,122
Patented July 16, 1963

3,098,122

CIRCUIT ARRANGEMENT FOR AN INTERCOM SYSTEM WITH ALTERNATIVE OPERATION

Hans-Ulrich Knauer, Kornwestheim, and Georg Vogel, Schwieberdingen, Ludwigsburg, Germany, and Rudolf Bayer, Vienna, Austria, assignors to International Standard Electric Corporation, New York, N.Y., a corporation of Delaware Filed Feb. 8, 1961, Ser. No. 87,866
Claims priority, application Austria Feb. 10, 1960
7 Claims. (Cl. 179—1)

Intercommunication systems serve to exchange sound information between two or more stations in such a way that at any one time, only one communication direction is possible as decided by the position of control contacts. Preferably sound transducers are used, which can be used either as a microphone or as a loudspeaker according to the desired communication direction.

The control of the communication direction in simple embodiments is made by a contact button or switch, which actuates the control contacts directly or which actuates relays carrying the control contacts.

The circuit arrangement of the present invention is made such that one station is made the master station containing all the necessary means such as switches, buttons and relays for establishing a connection to the desired called station; means for switching-in the amplifier; and operating means for controlling the communication direction while the other stations are receiving stations only. In the chosen embodiment, one master station is coordinated with a number of substations. Prior-art systems a number of master stations which communicate with all substations, with certain ones of the substations, or with each other.

In some of these prior-art systems it is necessary to provide means in the substation to signal the master station to stand by while in others it is necessary to arrange the system such that an unauthorized hearing by the master station and by the substation are suppressed.

There have been solutions of this problem of signalling the master station by providing the substations with additional optical or acoustical means.

The bar against unauthorized listening by the master station has been effected by disconnecting the sound transducer from the input of the amplifier in the master station.

The bar against unauthorized listening by the substations has been effected by disconnecting the sound transducer of the substation from the communication lines to the master station while in the master station the sound transducer is switched-in for the duration of the communication.

It is also known to use a rectifier preceding the sound transducer in the substation which is made ineffective during the communication period. The rectifier is biased in such a way that the low microphone level is suppressed but, the higher loudspeaker level is passed.

All these solutions have different disadvantages. In some systems, it is necessary to provide additional optical or acoustical signal arrangements which necessitate more equipment and more material. Additionally, the master station is only able to communicate with the substation when the substation has switched-over from the rest position to the stand-by position, by switching in the sound transducer in the lines or by making the rectifier ineffective.

The inventive circuit arrangement allows the direct speaking to the master station or substation at any time with listening being possible only after a switch has been thrown in the speaking station. Additional optical and acoustical means as well as additional line material are thereby avoided.

The present invention relates to a circuit arrangement for an intercommunication system using a sound transducer as a microphone and as a louspeaker or microphone-telephone-combination and with the switching of the amplifier to the microphone or loudspeaker being controlled by contacts in the master station.

The inventive circuit arrangement is characterized in this that the connection between the master station and the substation includes at least two control lines to be switched by the master station and one reference return line. Contacts controlled by the master station in a first position, switch the first and the second control lines to the output of the amplifier and in a second position, switch the second control line to the input of the amplifier, leaving the other control line open. One terminal of the sound transducer of the substation can be switched by a switching-over contact either to the first or to the second control line, depending on the position of the switch in the master station which switches the first and second control lines. The switching of the sound transducer in the substation to the first line allows the substation only to hear and switching of said sound transducers in the substation to the second line allows the substation to hear and to speak.

The inventive circuit arrangement is further characterized in a second embodiment in which the contact in the master station has one position which switches the first and second control lines to the output of the amplifier and has a second position which switches off the first control line from the output of the amplifier and connects the first line with the reference return line. In the substation a connection is provided from the first line over a working contact, simultaneously activated with the switching over contact of the substation, to a fourth line between the master station and the substation. A further contact controlled by the master station connects one terminal of the voltage source of the amplifier either to the reference (return) line or to the fourth line.

Another embodiment is provided in which a first switching-over contact, and if necessary, the working contact in the substation are break contacts and that a second switching-over contact is provided for switching the terminal of the sound transducer in the substation either to the first switching-over contact or to the second line, whereby the second switching-over contact is provided with means to hold it in a fixed position. In this embodiment, the contacts of the master station are arranged to be either locking or non-locking.

The inventive circuit arrangement is characterized in a fourth embodiment in which the master station includes one terminal of the voltage source of the amplifier which can be selectively connected to the reference return line by a working contact, which can be locking or non-locking.

Other objects and features of the invention will become apparent and the invention will be best understood when the specification is read in conjunction with the accompanying drawings comprising FIGURES 1 to 5 in which.

Figure 1:
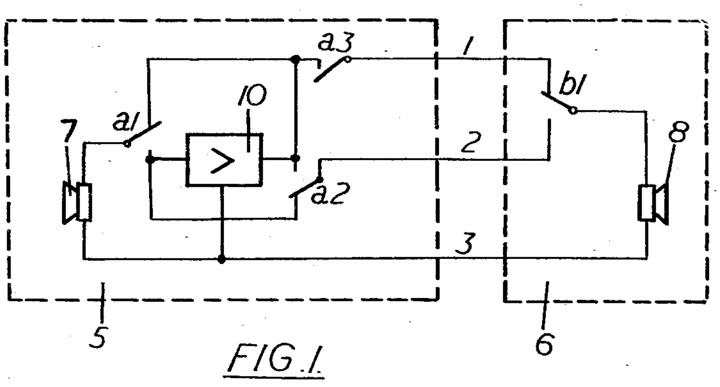
FIGURE 1 shows the basic circuit arrangement according to the invention.

Referring now to FIGURE 1, the contacts *a1*, *a2*, and *a3* for controlling the communication direction, are operated simultaneously by a push-button not shown. The sound transducer of the master station bears the reference number 7. The amplifier of the master station has the number 10. The lines 1, 2, and 3 respectively are called herein "first control line," "second control line" and "return line."

One terminal of the sound transducer 8 of the substation 6 is connected to the amplifier 10 of the master station 5 via the contact *b*1, which selectively connects the lines 1 and 2 to the output of the amplifier 10 in case contacts *a*1, *a*2 and *a*3 of the master station 5 are operated. In the event contacts *a*1, *a*2, and *a*3 are unoperated, line 2 is connected to the input of the amplifier 10 with line 1 being disconnected.

In the switching position shown in FIGURE 1, corresponding to the rest position of the system, no hearing or speaking condition is possible. As soon as the contacts *a*1, *a*2, and *a*3 are closed, sound transducer 7 in the master station 5 is connected to the input of amplifier 10 and the sound transducer 8 of the substation 6 is connected to the output of the amplifier 10 regardless of the position of contact *b*1 whereby the speaking path from the master station 5 to the substation 6 is completed.

As soon as the speaking button, contact *b*1 of the substation 6, is operated, from the rest position as shown to the lower position into contact with line 2, the sound transducer 8 of the substation 6 is connected to the input of the amplifier 10 via lines 2 and 3 if the master station contacts *a*1, *a*2, and *a*3 are in the position as shown. In such case, the sound transducer 7 of the master station 5 is connected to the output of the amplifier 10 and the speaking path from substation 6 to the main station 5 is completed.

In case the contacts *a*1, *a*2, and *a*3 in the master station 5 are simultaneously closed with the operation of contact *b*1 in the substation 6 to its talking position, sound transducer 7 of the master station 5 is connected to the input of the amplifier 10 and the sound transducer 8 of the substation 6 is connected to the output of the amplifier via the lines 2 and 3, whereby the speaking path to master station 5 from the substation 6 is opened. It is seen that in case of simultaneous operation the master station is preferred.

Figure 2:
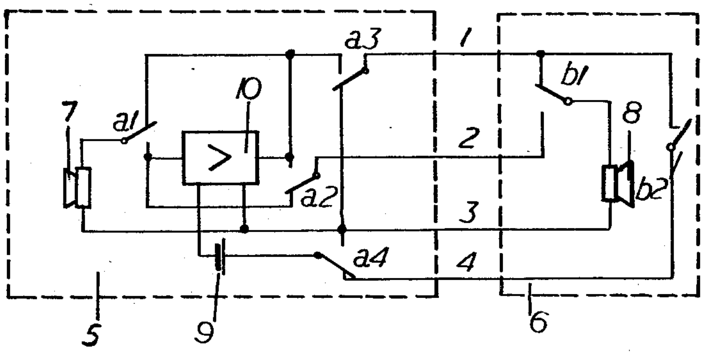
FIGURE 2 shows the arrangement of FIGURE 1 modified to include control of the voltage source amplifier.

FIGURE 2 shows an embodiment of the inventive circuit arrangement in which the amplifier 10 of the master station is operated with a voltage source 9, such as commonly used with transistor amplifiers. In this case it is advantageous to activate the amplifier 10 only for the time of operation. Since according to the invention, the master station 5 as well as the substation 6 can initiate communication it is necessary that the master station 5 as well as the substation 6 have means for energizing the amplifiers 10 by connecting the voltage source 9 to the amplifier 10. In the master station 5 this is effected by an additional contact *a*4. In the substation 6, however, beyond the addition of a switching contact *b*2, additional lines to the amplifier 10 are necessary. As can be seen in FIGURE 2, line 1, which is unused in the speaking path connection from the substation to the master station is used for controlling the operation of the amplifier. Therefore, only one additional line 4 is necessary which is designated as the "fourth line."

The starting of the amplifier 10 is effected for a speaking path from the master station to the substation by the operation of contact *a*4 of the master station and is effected for a speaking path from the substation to the master station by the operation of contacts *b*2 of the substation associated with lines 1 and 4. These lines are used in case of the speech path from the main station to the substation with contacts *b*1 and *b*2 of the substation at rest, thereby exploiting these lines 1 and 4 several times.

Figure 3:
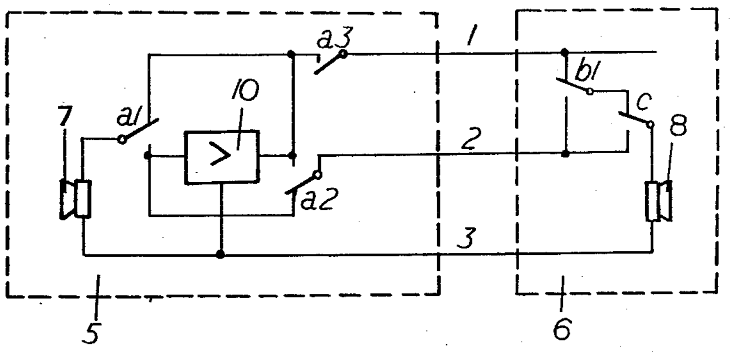
FIGURE 3 shows FIGURE 1 modified to permit the use of break contacts.

FIGURE 3 shows the circuit arrangement according to FIGURE 1 modified with the inclusion of a contact *c* in substation 6.

In case the contacts *a*1, *a*2, and *a*3 of the speaking buttons in the master station and contacts *b*1 and *c* in the substation are designed as non-locking buttons or switches, any unnoticed or unauthorized listening by the other station is avoided since both transducers are disconnected from the amplifier input except when intentionally operated.

Sometimes it may be desired to switch-in the system permanently or for shorter periods for listening to the sound of a children's room in case of "baby-sitter"-operation, for the supervision of unattended store rooms, or for the supervision of unattended machines in operation. For this purpose, the substation can be provided with a locking contact *c* and a non-locking contact *b*1.

Figure 4:
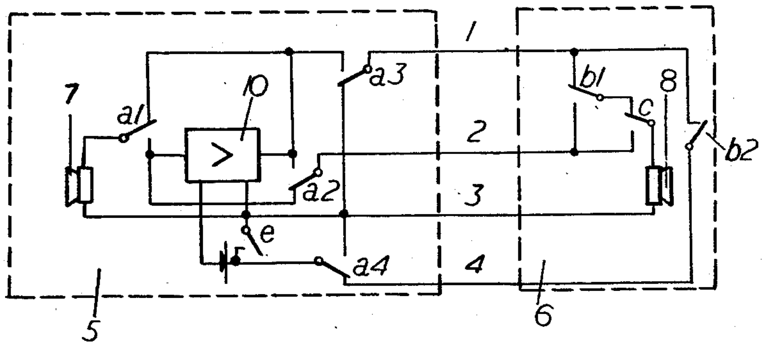
FIGURE 4 is the combination of FIGURES 1, 2, and 3 and including a listening button.

The circuit arrangement according to FIGURE 2 can be also expanded for listening operations by inserting into the substation 6 as shown in FIGURE 3 the additional contact *c* activated by a "repetition-button." Such an arrangement is shown in FIGURE 4 in which a contact *e* is included in the master station for starting amplifier 10. This contact *e* can be made locking or non-locking.

The inventive circuit arrangements according to the FIGURES 1 through 4 have been described for a master station and one substation. It is obvious that without deviation from the inventive idea such system can be made of one or more master stations with one or several substations.

Figure 5:
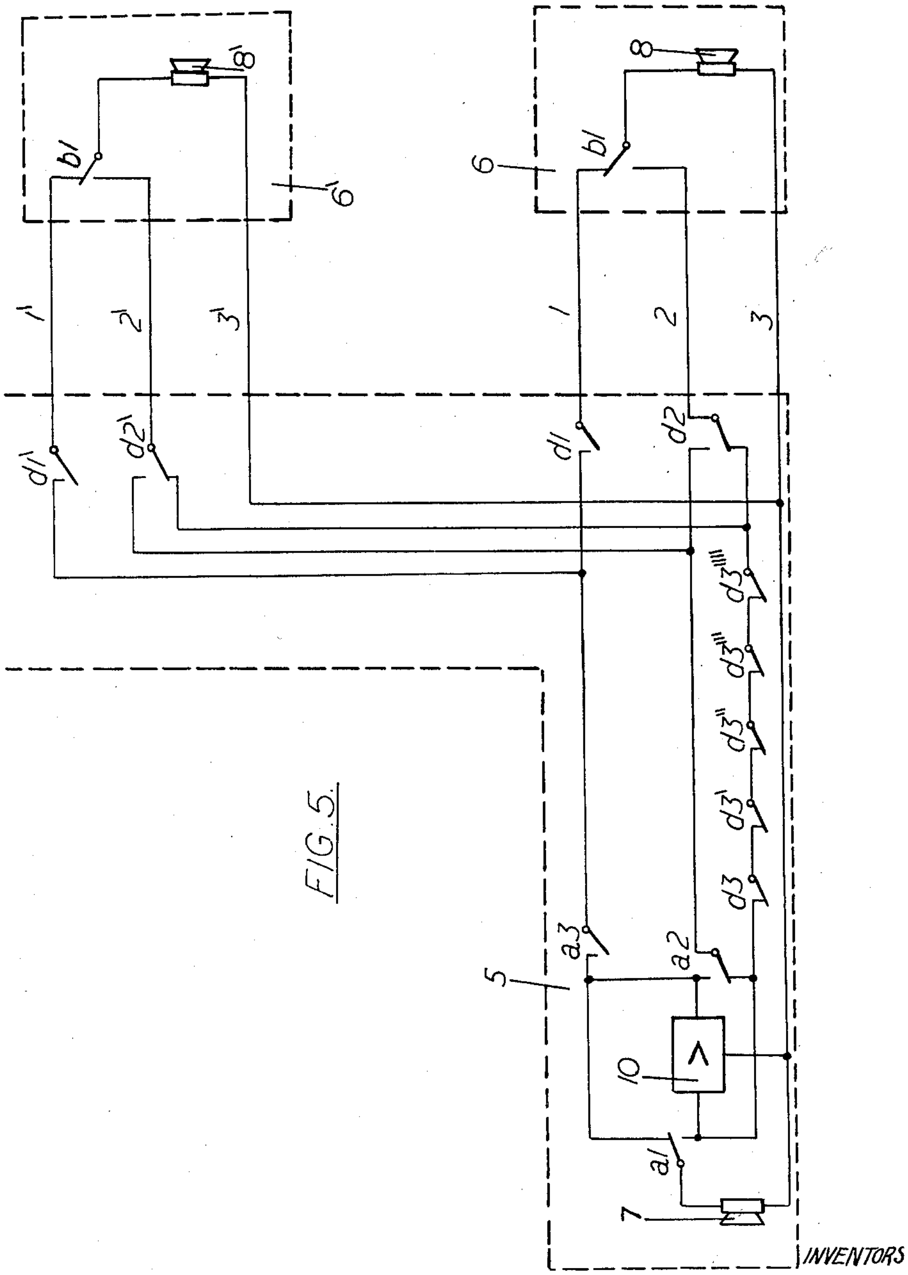
FIGURE 5 shows a basic overall circuit diagram of the system.

In FIGURE 5 a basic circuit arrangement according to FIGURE 1 is shown for a system having one master station and five substations. Only two substations 6 and 6' are shown for simplicity. According to this circuit arrangement, the master station has a switching-on button for each substation with the corresponding contacts *d*1, *d*2, or *d*1', *d*2' respectively, with which the connection from the master station 5 to the described substations 6, 6' is effected. The lines 1, 2, 3 or 1', 2', 3' respectively, connect the master station with the substations. In the rest condition (condition shown) the lines 2, 2' are connected to the input of the amplifier and, therefore, each substation 6, 6' can speak to the master station only by operating its speaking button and requesting the communication.

For avoiding disturbance of an existing communication path the circuit arrangement can be expanded by contacts *d*3, *d*3' which disconnect line 2 of the non-calling substations as soon as the switching-in contacts *d*1, *d*2, or *d*1', *d*2' respectively are activated.

While the principles of the invention have been described above in connection with specific apparatus and application, it is to be understood that this description is made only by way of example and not as a limitation on the scope of the invention.

We claim:

1. An intercommunication system comprising a master station and a remote station interconnected by a three-wire transmission line, transducer means in each station for transmitting and receiving speech signals, amplifier means in said master station for amplifying said speech signals from each of said transducer means, switch means in said master station having a first position for connecting the associated transducer means to the output of said amplifying means and for connecting the transducer means of said remote station to the input of said amplifying means and having a second position for reversing the last said connections, and switch means in said remote station having a first position for connecting the associated transducer means to the output of said amplifying means when said master station switch means is in its said first position and having a second position for connecting the associated transducer means to the input of said amplifying means when said master station switch means is in its said first position and for connecting the last-said transducer means to the output of said amplifying means when said master station switch means is in its said second position.

2. An intercommunication system as set forth in claim 1 wherein one side of the said transducer means in the said master station is directly interconnected with one side of the transducer means of the said remote station over one of said wires and wherein the other said wires are selectively connected to both said transducer means by said master station and remote station switch means.

3. An intercommunication system as set forth in claim 1 wherein said amplifying means is normally deenergized and wherein said transmission line includes a fourth wire controlled by either of said switch means for selectively energizing said amplifying means.

4. An intercommunication system as set forth in claim 1 wherein said remote station switching means includes means for locking said switching means in either of its said first and second positions.

5. An intercommunication system as set forth in claim 4 wherein said master switching means includes means for locking said master station switching means.

6. An intercommunication system as set forth in claim 2 wherein said master station includes locking switch means for maintaining said amplifier means energized.

7. In an intercommunication system as set forth in claim 1, a plurality of said remote stations each interconnected with said master station over separate three-wire transmission line, a plurality of second switch means in said master station for respective ones of said remote stations, and means responsive to the operation of the said second switch means associated with any selected remote station for disconnecting the transducer means of all other remote stations from the input of said amplifying means.

References Cited in the file of this patent

UNITED STATES PATENTS 2,162,369 Campbell ---------------- June 13, 1939